(12) United States Patent
Rich

(10) Patent No.: US 8,572,487 B2
(45) Date of Patent: Oct. 29, 2013

(54) APPLICATION OF RATINGS TO DIGITAL MUSIC AND PLAYBACK OF DIGITAL MUSIC CONFORMING TO A RATING LEVEL

(75) Inventor: Lawrence S. Rich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1467 days.

(21) Appl. No.: 11/868,984

(22) Filed: Oct. 9, 2007

(65) Prior Publication Data

US 2009/0094516 A1  Apr. 9, 2009

(51) Int. Cl.
*G06F 3/00* (2006.01)
(52) U.S. Cl.
USPC ........... 715/704; 715/716; 715/781; 715/728; 725/25; 725/134
(58) Field of Classification Search
USPC .............. 715/704, 716, 781, 828; 725/25, 32, 725/134
See application file for complete search history.

(56) References Cited

U.S. PATENT DOCUMENTS

| | | | |
|---|---|---|---|
| 6,337,947 B1 | 1/2002 | Porter et al. | |
| 7,380,258 B2 * | 5/2008 | Durden et al. | 725/25 |
| 7,457,784 B2 * | 11/2008 | Hashimoto et al. | 705/500 |
| 8,166,407 B2 * | 4/2012 | Lee et al. | 715/751 |
| 2004/0181613 A1 * | 9/2004 | Hashimoto et al. | 710/1 |
| 2004/0250272 A1 * | 12/2004 | Durden et al. | 725/25 |
| 2004/0261099 A1 * | 12/2004 | Durden et al. | 725/32 |
| 2005/0015712 A1 * | 1/2005 | Plastina et al. | 715/500.1 |
| 2006/0259429 A1 * | 11/2006 | Hug | 705/50 |
| 2008/0092168 A1 * | 4/2008 | Logan et al. | 725/44 |
| 2008/0222673 A1 * | 9/2008 | Durden et al. | 725/25 |
| 2010/0011392 A1 * | 1/2010 | Bronstein et al. | 725/28 |
| 2010/0281179 A1 * | 11/2010 | Istavan et al. | 709/231 |
| 2012/0066637 A1 * | 3/2012 | Nakamura et al. | 715/781 |

FOREIGN PATENT DOCUMENTS

EP  1732324 A2 * 12/2006
WO  WO0237853 A1  5/2002

OTHER PUBLICATIONS

Bharucha; Music Perception and Cognition; 2002; New York; vol. 2; 40 pages.*
Lavinia Egidi et al. "Bringing Multimedia Contents into MP3 Files" Entertainment Everywhere, IEEE Communications Magazine, IEEE Service Center, Piscataway, US, vol. 43, No. 5 XP011134850. May 1, 2005.
Yahoo, Music Jukebox, "Explicit Lyrics Filter", Copyright 2007. http://www.draftlight.net/dnex/mp3player/ "Flash Music Player with XSPF and M3U Playlist Support", Copyright 2002-2007.

* cited by examiner

*Primary Examiner* — Linh K Pham
(74) *Attorney, Agent, or Firm* — Lee Law, PLLC; Christopher B. Lee

(57) ABSTRACT

The present invention is directed to a method and system for applying ratings to digital music and for playing back digital music conforming to a rating level. A method for playing back digital music conforming to a rating level, includes: sending a request for metadata from a music player to a metadata service; receiving metadata sent back from the metadata service in response to the request, the metadata comprising information regarding at least one explicit interval of the track; playing the track on the music player; and selectively applying an edit to each explicit interval of the playing track identified in the metadata, based on a predetermined rating level.

14 Claims, 2 Drawing Sheets

APPLICATION OF RATINGS TO DIGITAL MUSIC AND PLAYBACK OF DIGITAL MUSIC CONFORMING TO A RATING LEVEL

FIELD OF THE INVENTION

The present invention relates to digital music, and more specifically relates to a method and system for applying ratings to digital music and for playing back digital music conforming to a rating level.

BACKGROUND OF THE INVENTION

Many people have large digital music collections that they would like to share (e.g., with their children), but do not have the time to screen individual files for inappropriate content.

There are conventions for labeling albums which contain explicit material, through a collaboration between the Recording Industry Association of America (RIAA) and music artists, and occasionally digital music outlets will offer both an "original" and a "clean" version of a song or album. The "clean" version typically contains "bleeps" in place of the offensive material or has been re-mixed with the offensive material removed/edited. Thus, a user must either purchase both the "original" and the "clean" versions of the song or purchase just the "clean" version of the song.

A similar situation exists with radio where, in order to meet FCC standards, radio stations are required to play a "clean" radio-edit of a song. Further, in order to appease certain constituents, some of the major "box-stores" will only sell "clean" albums and songs in its store and online. This has generated a backlash among music purists and a loss of business for the stores.

One proposed solution for preventing explicit lyrics from being played includes tagging a song as containing explicit lyrics. A music player can be configured to recognize the explicit lyrics tag and to selectively prevent the song from being played. Unfortunately, this prevents the entire song from being played, even if it includes only a small number of explicit lyrics.

Accordingly, there is a need for a solution that addresses these and other deficiencies of the related art.

SUMMARY OF THE INVENTION

The present invention is directed to a method and system for applying ratings to digital music and for playing back digital music conforming to a rating level (e.g., a parental rating).

A first aspect is directed to a method for playing back digital music conforming to a rating level, comprising: sending a request for metadata from a music player to a metadata service; receiving metadata sent back from the metadata service in response to the request, the metadata comprising information regarding at least one explicit interval of the track; playing the track on the music player; and selectively applying an edit to each explicit interval of the playing track identified in the metadata, based on a predetermined rating level.

A second aspect is directed to a metadata service, comprising: obtaining metadata comprising information regarding at least one explicit interval of a track; receiving a request from a music player for the metadata; and sending the metadata to the music player.

A third aspect is directed to a music player for playing back digital music conforming to a rating level, comprising: a system for playing a track; and a system for selectively applying an edit to at least one explicit interval of the track identified in metadata associated with the track, based on a predetermined rating level.

A fourth aspect is directed to a program product stored on a computer readable medium, which when executed, plays back digital music conforming to a rating level, the computer readable medium comprising program code for: sending a request for metadata from a music player to a metadata service; receiving metadata sent back from the metadata service in response to the request, the metadata comprising information regarding at least one explicit interval of the track; playing the track on the music player; and selectively applying an edit to each explicit interval of the playing track identified in the metadata, based on a predetermined rating level.

A fifth aspect is directed to a method for deploying an application for playing back digital music conforming to a rating level, comprising: providing a computer infrastructure being operable to: send a request for metadata from a music player to a metadata service; receive metadata sent back from the metadata service in response to the request, the metadata comprising information regarding at least one explicit interval of the track; play the track on the music player; and selectively apply an edit to each explicit interval of the playing track identified in the metadata, based on a predetermined rating level.

The illustrative aspects of the present invention are designed to solve the problems herein described and other problems not discussed.

BRIEF DESCRIPTION OF THE DRAWINGS

These and other features of the present invention will be more readily understood from the following detailed description taken in conjunction with the accompanying drawings.

Figure 1:
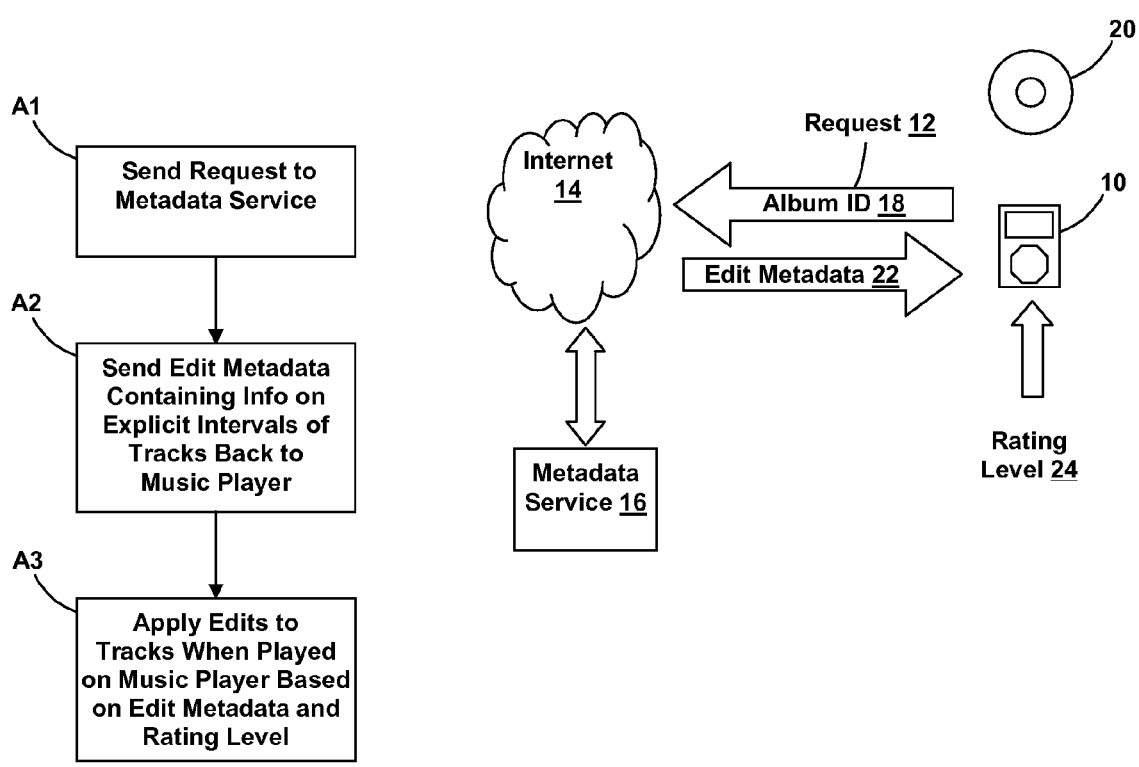
FIG. 1 depicts a hybrid flow diagram of an illustrative process for applying ratings to digital music and for playing back digital music conforming to a desired rating level in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the present invention is directed to a method and system for applying ratings to digital music and for playing back digital music conforming to a rating level.

Referring now to the drawings, FIG. 1 depicts a hybrid flow diagram of an illustrative process for applying ratings to digital music and for playing back digital music conforming to a desired rating level in accordance with an embodiment of the present invention.

In A1, a music player 10 makes a request 12 via the internet 14 to a metadata service 16 using an identifier 18 of an album 20. The album 20 can be identified by a hash algorithm based on a table of its contents or in any other suitable manner. In accordance with the present invention, the music player 10 is intended to include any system, device, software (e.g., digital audio management software), etc., or combination thereof, that is capable of playing digital music obtained from any source (e.g., a CD, MP3 file, streaming audio, online music store, and/or the like). Further, an album 20 is intended to include a set of one or more tracks.

Online music metadata services have been used to provide, based on an identifier of an album, album and/or track titles and/or album art, which are used by music players in various ways. The present invention extends this metadata by including information about potentially undesirable, explicit intervals of tracks (e.g., songs) on an album, such that, as detailed below, the music player 10 can apply required "edits" to a given track "on-the-fly" based on a rating level set by a parent or other user.

In A2, in response to the request 12, the metadata service 16 sends edit metadata 22 including information about explicit intervals of tracks on the album 20 back to the requesting a music player 10. For example, assuming the metadata service 16 is using some form of XML over HTTP, the edit metadata 22 can be provided in a form such as:

```
<editMetadata albumId="_6vyusadr5a67vfvg7>
    <editTrack trackNumber=7>
        <edit interval="00:00:23.00, 00:00:25.00"
        requiresRating="PG-13">
        <edit interval="00:01:23.20, 00:01:27.00"
        requiresRating="PG">
    </editTrack>
    <editTrack trackNumber=9>
        <edit interval="00:03:01.69, 00:03:06.22" requiresRating="R">
        <edit interval="00:04:14.00, 00:04:18.00"
        requiresRating="PG">
    </editTrack>
</editMetadata>
```

In this example, track 7 on an album with an ID of "6vyusadr5a67vfvg7" has been identified as including an interval from "00:00:23.00" to "00:00:25.00", which has been given a rating of "PG-13", and an interval from "00:01:23.20" to "00:01:27.00", which has been given a rating of "PG". In addition, another track, namely track 9 on the same album, has been identified as including an interval from "00:03:01.69" to "00:03:06.22", which has been given a rating of "R", and an interval from "00:04:14.00" to "00:04:18.00", which has been given a rating of "PG". Such ratings can be provided to the metadata service 16 by, for example, the content providers, a third party, etc., and can be based on any now known or later developed standards (e.g., set by the RIAA).

In A3, after receiving the edit metadata 22 from the metadata service 16, the music player 10 applies the "edits" set forth for each track in the edit metadata 22 when that track is played, based on a rating level 24 set by a parent or other user. The edits can be applied using a filter, as presented in greater detail below. The rating level 24 can be set, for example, via the preferences of the music player 10 and can be selectively locked (e.g., using a password) to prevent a child or other user from changing the rating level 24. Further, a locked music player 10 could require the edit metadata 22 before any tracks can be played (e.g., the edit metadata 22 can indicate that "there are no explicit intervals" in a track(s)).

Using the example of edit metadata 22 described above, the music player 10, when playing back track 7 at a rating level 24 of "G", would apply two filters, one for two seconds at 23 seconds, and another for 3.8 seconds at 1:23.20, since the rating levels of "PG-13" and "PG" indicate that each respective interval contains material that is more "explicit" than that which is acceptable at the rating level of "G". Similarly, the music player 10, when playing back track 7 at a rating level 24 of "PG", would only apply the first filter, since the rating level of "PG-13" indicates that the respective interval contains material that is more "explicit" than that which is acceptable at the rating level of "PG". In general, a filter is applied to a given interval if the rating level of that interval is "higher" (i.e., the interval contains material that is more "explicit") than that which is acceptable at the rating level 24. If the music player 10 is unlocked, or if a rating level 24 has not been set or has been set at a high enough level (e.g., "R", "NC-17", etc.), then track 7 would be played in its original form. A similar process would be performed for track 9.

In an embodiment, a filter is applied by the music player 10 to the audio stream when a track is played. Any type of filter capable of sufficiently attenuating, scrambling, etc., the requisite sections of a given track identified in the edit metadata 22 can be used. For example, a "pass-band" filter can be used to remove the vocals from the track. In another embodiment, the music player 10 can simply generate a sound (e.g., tone) and/or the like, which is played over the offending sections identified in the edit metadata 22 (e.g., the lyrics are "bleeped-out" and cannot be heard).

Metadata is commonly stored in MP3 players using a standard called IDV3. IDV3 includes the ability for applications to define new metadata "frames". To this extent, the edit metadata 22 could be stored permanently in an MP3 file once it has been obtained from the metadata service 16, enabling it to travel to portable music players. Online music services could also sell tracks with the edit metadata 22 already included. In this case, the metadata service 16 may not be required. Further, instead of being included in a track, the edit metadata 22 can be associated with the track in some manner. For example, the edit metadata 22 can be associated with a track using a naming convention (e.g., mysong.mp3/mysong.metadata), by recording the association explicitly (e.g., mysong.mp3->231563651.metadata), or by recording the edit metadata 22 in a separate metadata record in a database.

Figure 2:
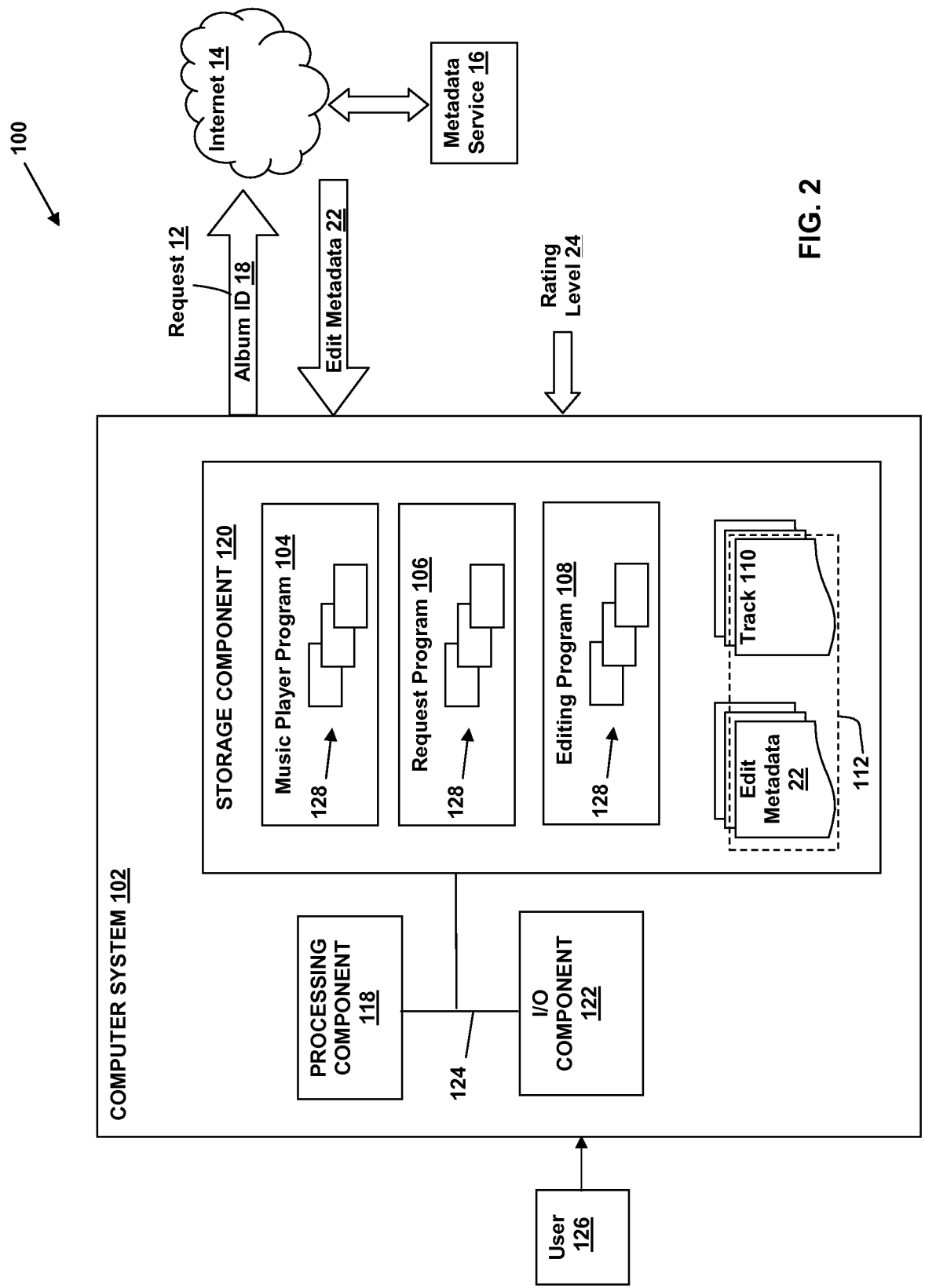
FIG. 2 depicts an illustrative environment for implementing embodiment(s) of the present invention.

FIG. 2 shows an illustrative environment 100 for applying ratings to digital music and for playing back digital music conforming to a desired rating level in accordance with any/all embodiments of the disclosure. To this extent, environment 100 includes a computer system 102 that can perform the processes described herein. For example, the computer system 102 can be configured to include a music player program 104 for playing and outputting digital music, a request program 106 for sending a request 12 via the internet 14 to a metadata service 16 using an identifier 18 of an album, and an editing program 108 for applying the edits set forth in the edit metadata 22 received from the metadata service 16 to each track of the album when the track is played by the music player program 106, based on a rating level 24 set by a parent or other user (e.g., user 126), by performing the processes described herein. The environment 100 can comprise, for example, a portable music player, a computer-based program capable of playing digital music, digital audio management software capable of obtaining the edit metadata 22 and importing the edit metadata 22 into a digital audio player, etc.

The computer system 102 is shown including a processing component 118 (e.g., one or more processors), a storage component 120 (e.g., a storage hierarchy), an input/output (I/O) component 122 (e.g., one or more I/O interfaces and/or devices), and a communications pathway 124. In general, the processing component 118 executes program code, such as the music player program 104, request program 106, and editing program 108, which are at least partially stored in the storage component 120. While executing program code, the processing component 118 can read and/or write data to/from the storage component 120 and/or the I/O component 122. Such data can include, for example, the edit metadata 22 received from the metadata service 16 for one or more tracks 110 of one or more albums 20 (a given track 110 and its corresponding edit metadata 22 can optionally be stored together in a single file 112 (e.g., an MP3 file), or associated in some suitable manner, as indicated in phantom). The communication pathway 124 provides a communications link between each of the components in computer system 102. The I/O component 122 can comprise one or more human I/O devices (e.g., display, speaker, headphone jack, click wheel, etc.), which enable a human user 126 to interact with the computer system 102, and/or one or more communications devices to enable other computer system(s) to communicate with the computer system 102 using any type of communications link.

The computer system 102 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the music player program 104, request program 106, and editing program 108 can be embodied as any combination of system software and/or application software. Further, the music player program 104, request program 106, and editing program 108 can be implemented using a set of modules 128. In this case, a module 128 can comprise a component that performs a set of actions used by the music player program 104, request program 106, and editing program 108. Further, it is understood that some of the actions discussed herein may not be implemented or additional actions may be implemented by computer system 102.

When the computer system 102 comprises multiple computing devices, each computing device can have only a portion of the music player program 104, request program 106, and editing program 108 installed thereon (e.g., one or more modules 128). However, it is understood that the computer system 102 is only representative of various possible equivalent computer systems that may implement the process described herein. To this extent, in other embodiments, the actions implemented by the computer system 102 can be at least partially implemented by one or more computing devices that include any combination of general and/or specific purpose hardware and/or program code. In each embodiment, the program code and hardware can be provided using standard programming and engineering techniques, respectively.

When the computer system 102 includes multiple computing devices, the computing devices can communicate over any type of communications link. Further, while performing the process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

It is understood that each of the process flows shown and described herein is only illustrative. To this extent, numerous variations of these process flows are possible, and are included within the scope of this disclosure. Illustrative variations include performing one or more processes in parallel and/or a different order, performing additional processes, not performing some processes, and/or the like. To this extent, the computer system 102, music player program 104, request program 106, and editing program 108 can utilize multiple tasks/threads/processes to perform the actions of the processes described herein.

It is further understood that aspects of the invention further provide various alternative embodiments. For example, in one embodiment, the invention provides a computer program stored on at least one computer-readable medium, which when executed, enables a computer system to perform the processes described above. To this extent, the computer-readable medium can include program code, such as the music player program 104, request program 106, and editing program 108, which implement some or all of the process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; a modulated data signal having one or more of its characteristics set and/or changed in such a manner as to encode information in the signal; paper; etc.

In another embodiment, a computer system, such as the computer system 102, can be obtained (e.g., provided, created, maintained, made available, etc.) and one or more programs/systems for performing the process described herein can be obtained (e.g., provided, created, purchased, used, modified, etc.) and deployed to the computer system. To this extent, the deployment can comprise one or more of: (1) installing program code on a computing device from a computer-readable medium; (2) adding one or more computing devices to the computer system; and (3) incorporating and/or modifying the computer system to enable it to perform the process described herein.

Aspects of the invention can be also implemented as part of a business method that performs the process described herein on a subscription, advertising, and/or fee basis. That is, a service provider could offer to provide some/all of the components/processes needed to apply ratings to digital music and to play back digital music conforming to a desired rating level, as described herein. In this case, the service provider can manage (e.g., create, maintain, support, etc.) some or all of the environment 100, such as the computer system 102, music player program 104, request program 106, and editing program 108, that performs the process described herein for one or more customers. In return, the service provider can receive payment from the customer(s) under a subscription and/or fee agreement, receive payment from the sale of advertising to one or more third parties, and/or the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method for playing back digital music conforming to a rating level, comprising:

sending a request for metadata of an album from a music player to a metadata service server, where the request comprises an identifier of the album generated using a hash algorithm of a table of contents (TOC) of the album;

receiving the requested metadata as an extensible markup language (XML) file sent back from the metadata service server in response to the request, the metadata comprising information regarding at least one explicit time interval of a track of the album, and a start time and an end time of each time interval, encoded within the XML file using audio edit XML tags;

playing the track of the album on the music player; and selectively applying an edit to each explicit time interval of the playing track identified in the metadata of the album, based on a predetermined rating level, comprising applying a filter to a portion of an audio stream of the playing track corresponding to each explicit time interval, where the applied filter one of attenuates, scrambles, and removes vocals from the track without changing other musical content of the track of the album.

2. The method of claim 1, wherein the information comprises a rating level, and wherein an edit is applied to each explicit time interval comprising a rating level that is higher than the predetermined rating level.

3. The method of claim 1, wherein selectively applying an edit further comprises:

playing a sound over each explicit time interval of the playing track.

4. The method of claim 1, further comprising:

setting the predetermined rating level of the music player; and generating the identifier of the album generated using the hash algorithm of the TOC of the album.

5. The method of claim 1, further comprising:

locking the predetermined rating level of the music player.

6. The method of claim 1, further comprising:

storing the track and the metadata together in a music file.

7. A metadata service server, comprising:

a memory; and a processor programmed to:

obtain metadata comprising information regarding at least one explicit time interval of a track of an album, and a start time and an end time of each time interval, encoded within an extensible markup language (XML) file using audio edit XML tags, where the information comprises a rating level for each explicit time interval;

receive a request from a music player for the metadata of the album, where the request comprises an identifier of the album generated using a hash algorithm of a table of contents (TOC) of the album;

retrieve the XML file comprising the encoded metadata of the album from the memory using the identifier of the album; and send the metadata as the XML file to the music player.

8. A music player for playing back digital music conforming to a rating level, comprising:

a memory; and a processor programmed to:

receive metadata of an album as an extensible markup language (XML) file sent back from a metadata service server in response to a request for the metadata of the album, where the request comprises an identifier of the album generated using a hash algorithm of a table of contents (TOC) of the album, where the metadata comprises information regarding at least one explicit time interval of a track of the album, and a start time and an end time of each time interval, encoded within the XML file using audio edit XML tags;

store the metadata within the memory;

play the track of the album; and selectively apply an edit to the at least one explicit time interval of the playing track identified in the metadata of the album associated with the track, based on a predetermined rating level, comprising being programmed to apply a filter to a portion of an audio stream of the playing track corresponding to each explicit time interval, where the applied filter one of attenuates, scrambles, and removes vocals from the track without changing other musical content of the track of the album.

9. The music player of claim 8, where the processor is further programmed to: send a request for the metadata to the metadata service server.

10. The music player of claim 8, wherein the metadata comprises a rating level, and wherein the processor is programmed to apply an edit to each explicit time interval comprising a rating level that is higher than the predetermined rating level.

11. The music player of claim 8, wherein, in being programmed to selectively apply the edit to each explicit time interval of the playing track identified in the metadata of the album, the processor is programmed to:

play a sound over each explicit time interval of the playing track.

12. The music player of claim 8, where the processor is further programmed to:

set and lock the predetermined rating level of the music player.

13. The music player of claim 8, where in being programmed to store the metadata within the memory, the processor is programmed to:

store the track and the metadata together in a music file within the memory.

14. A program product stored on a computer readable storage device, which when executed, plays back digital music conforming to a rating level, the computer readable storage device comprising program code for:

sending a request for metadata of an album from a music player to a metadata service server, where the request comprises an identifier of the album generated using a hash algorithm of a table of contents (TOC) of the album;

receiving the requested metadata as an extensible markup language (XML) file sent back from the metadata service server in response to the request, the metadata comprising information regarding at least one explicit time interval of a track of the album, and a start time and an end time of each time interval, encoded within the XML file using audio edit XML tags;

playing the track of the album on the music player; and selectively applying an edit to each explicit time interval of the playing track identified in the metadata of the album, based on a predetermined rating level, comprising applying a filter to a portion of an audio stream of the playing track corresponding to each explicit time interval, where the applied filter one of attenuates, scrambles, and removes vocals from the track without changing other musical content of the track of the album.

* * * * *